W. SCHNEBLY.

Thrashing Machine.

No. 104,503. Patented June 21, 1870.

Witnesses
A. P. Kipp
A. G. Techune

Inventor
Wm. Schnebly

United States Patent Office.

WILLIAM SCHNEBLY, OF HACKENSACK, NEW JERSEY.

*Letters Patent No. 104,503, dated June 21, 1870.*

---

IMPROVEMENT IN THRASHING-MACHINES.

---

The Schedule referred to in these Letters Patent and making part of the same.

---

*To all whom it may concern:*

Be it known that I, WILLIAM SCHNEBLY, of Hackensack, Bergen county, and State of New Jersey, have invented Improvements in Flail Thrashing-Machines; and I do hereby declare that the following is a full and exact description thereof, reference being had to the accompanying drawing and letters of reference marked thereon.

The nature of my invention consists in the construction of flails or beaters with a coil, to impart to them a necessary degree of spring or flexibility that, when they are rigidly attached to an oscillating bar or shaft, and forced thereby downward, they will readily conform themselves to any condition of straw or fibrous substance, upon which they are made to operate, independently, without aid from any additional spring or device for that purpose. By this arrangement the power necessary to compress any other kind of spring will be entirely avoided, as I design to produce the result by the velocity of motion of the spring flails or beaters, and not by the force or blow created by the sudden expansion of a compressed spring effecting a flail.

In the method of connecting the two series of spring flails or beaters by means of crank-pins, arms and rods, so as to make one side counterbalance the other, alternately, it will be seen that if an effort were made to raise up either series of flails, separately and without such connection, they would assume the condition of a scale-beam, with a commodity on the one side of the fulcrum, destitute of the counterpoise weight on the other side.

In the method of conveying stalks of straw or fibrous substances through the machine while under the operation of the spring flails, in full or original length, untangled, and to expel or throw off the same in good condition for binding up, &c., by means of a series of rake-heads, containing a suitable number of teeth, being supported and carried by endless belts below the floor or bed, the teeth being made long enough to project upward through the spaces left in the bed, and supporting bars for that purpose.

To enable others to make and use my invention, I will proceed to describe its construction and operation.

Figure 3:
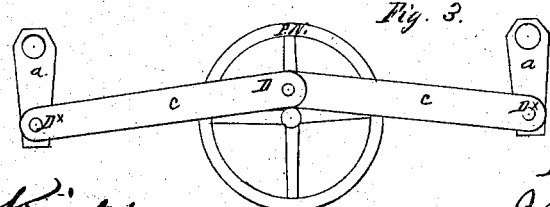

Figure 3 gives a side view of the connections, crank-pins, &c.

Figure 1:
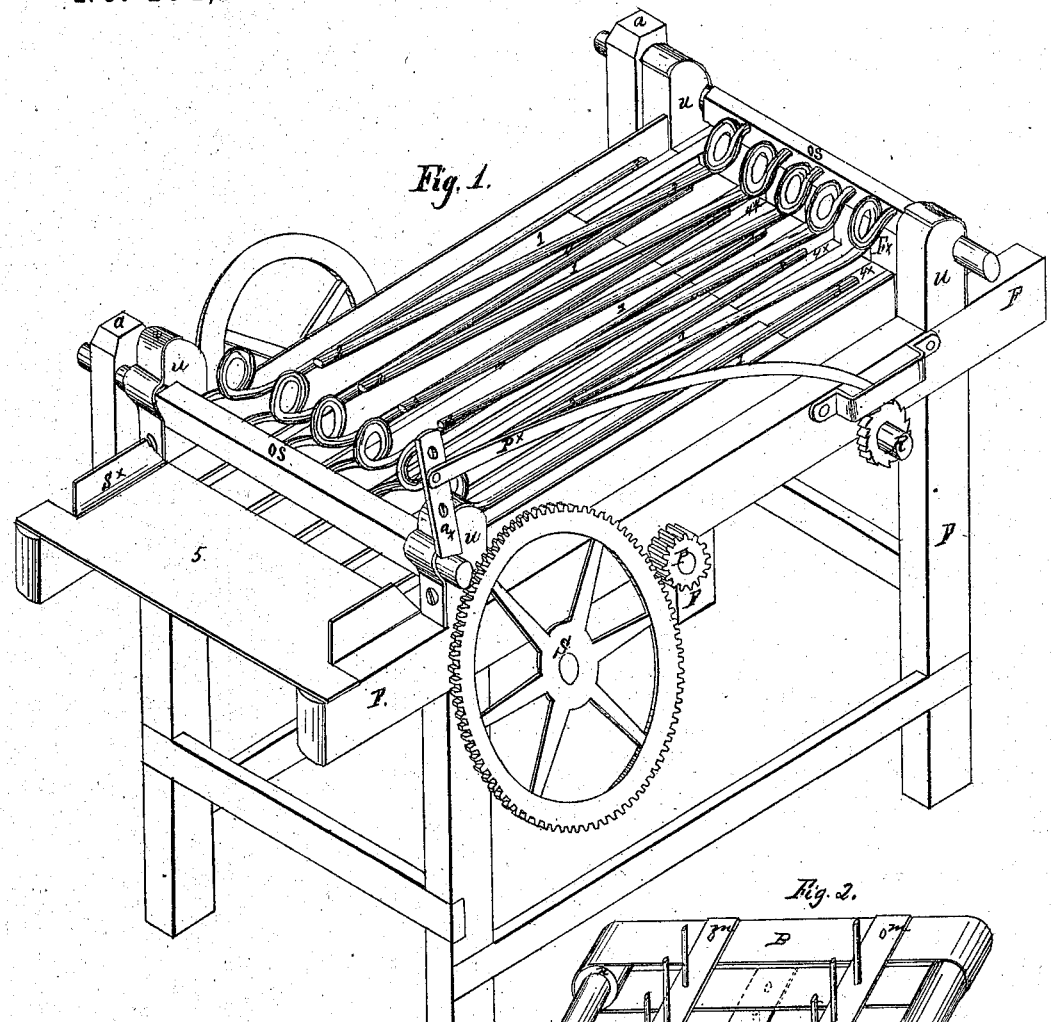
Figure 1 represents a perspective view.

In fig. 1 F F F represents a frame, of suitable length.

$F^x$ are cross-bars, long enough to make the frame F F F suitable for the full length of the substances to be thrashed.

$u\ u\ u\ u$ are upright supports, of sufficient height for the oscillating shafts or bars $o\ s\ o\ s'$. On one end of each are permanently fastened the crank-arms $a\ a$.

The oscillating shafts $o\ s\ o\ s'$ have rigidly attached to them each a series of metallic or other spring coiled flails, 2 2 2 2 2 and 3 3 3 3 3 3, of suitable length and diameter to give them a proper degree of flexibility, so as to conform readily to the condition of the commodity passing through under their operation.

5 is a receiving-floor or bed, which is continued under the spring flails to a suitable point, the floor or bed being supported by a series of bars running from cross-bars $F^x$ to $F^x$. The floor or bed 5 is provided with suitable spaces, 4 4 4 4, in line with the spaces between the bars $4^x\ 4^x\ 4^x\ 4^x$, through which the teeth 1 1 1 1 are permitted to pass for conveying purposes, and to dislodge the thrashed substances from the machine ready for binding, &c.

$S^x\ S^x$ are side guides to keep the stalks in place.

$a^x$ is a cam, rigidly fixed to the oscillating shaft $o\ s'$, having a series of holes for the purpose of governing the extent of the movement of the pawl $P^x$ and conveying-rakes. $P^x$ is made to operate on the ratchet R.

S is a spur-wheel, in gear with the pinion P.

Figure 2:
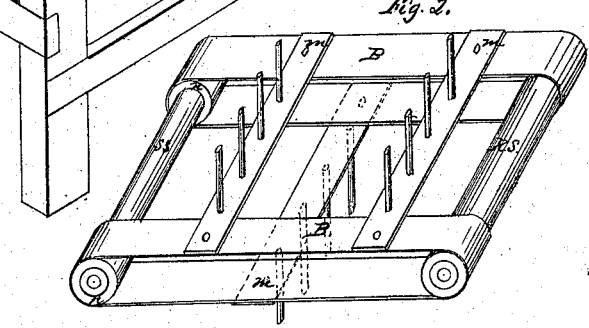
Figure 2 shows the arrangement of the conveying or carrying devices.

In fig. 2, S S is the spur-wheel shaft, and R S is the ratchet-wheel shaft, reaching from side to side of frame F F, and protruding sufficiently for the wheels to be fastened thereon.

On the shaft S S two loose pullies $n\ n$ are placed for the endless belts B B to rest on, and which may be driven by the ratchet-wheel shaft R S, without regard to the revolutions of the spur-wheel shaft S S.

The endless belts B B are provided with a series of rake-heads, $m\ m\ m$, with a sufficient number of teeth 1 1 1 1, made long enough to project upward for purposes expressed.

Fig. 3 gives a side view of the arms $a\ a$, fly-wheel F W, crank-pins D $D^x\ D^x$, and connecting-rods $c\ c$, so that, when the spur-wheel S is turned, it moves the pinion P and shaft, with the fly-wheel F W on the other end of the shaft, giving motion, by means of a crank-pin, alternately to the arms $a\ a$, oscillating the shafts $o\ s\ o\ s'$, with their spring flails 2 2 2 2 2 and 3 3 3 3 3 3, and, at the same time, producing the necessary movement of the conveying or carrying arrangement of belts B B, rake-heads, and teeth.

The flails, in their up-and-down movement, passing by each other, through their intermediate spaces, spend their force in giving a blow, derived from their momentum or velocity of motion, with the advantage of their counterbalancing arrangements.

What I claim, and desire to secure by Letters Patent is—

1. In the thrashing-machine herein described, the beaters 2 2 2 and 3 3 3, provided at their lower ends with a spring coil, in combination with the oscillating-shafts $o$ $s$ and $o$ $s'$, as herein shown and for the purposes set forth.

2. The combination of the arms $a$ $a$ with the oscillating shafts $o$ $s$ $o$ $s'$, and crank-pin D, fly-wheel F W and rods $c$ $c$, as herein described and for the purpose set forth.

3. The arrangement of the endless belts B B, provided with rake-heads $m$ $m$, in combination with the spring coil beaters and shafts $o$ $s$ $o$ $s'$, all constructed and operating as herein shown and described, for the purposes set forth.

WILLIAM SCHNEBLY.

Witnesses:
  A. P. KIPP,
  A. G. TERHUNE.